United States Patent [19]

Odom et al.

[11] Patent Number: 5,686,917
[45] Date of Patent: Nov. 11, 1997

[54] SYSTEM AND METHOD FOR DEMULTIPLEXING DATA IN AN INSTRUMENTATION SYSTEM

[75] Inventors: Brian Keith Odom, Pflugerville; Bob Mitchell, Austin, both of Tex.

[73] Assignee: National Instruments Corporation, Austin, Tex.

[21] Appl. No.: 423,470

[22] Filed: Apr. 19, 1995

[51] Int. Cl.⁶ .................... H04L 5/00; H04J 1/00
[52] U.S. Cl. ............................ 341/141; 370/535
[58] Field of Search ...................... 341/141, 155; 370/535, 537; 395/438

[56] References Cited

U.S. PATENT DOCUMENTS 5,062,101  10/1991  Dejewski .................... 359/135
5,408,615   4/1995  Ishikawa .................... 395/275

OTHER PUBLICATIONS

*MC689440, Dual–Channel Direct Memory Access Controller*, Motorola Semiconductor Products Inc., Austin, Texas, Feb., 1984, pp. 1–10 through 8-4, Foldout 1-8.

*Primary Examiner*—Jeffrey A. Gaffin
*Assistant Examiner*—Peguy JeanPierre
*Attorney, Agent, or Firm*—Conley, Rose & Tayon; Jeffrey C. Hood

[57] ABSTRACT

An instrumentation system according to the present invention which automatically demultiplexes multiplexed data received from multiple analog channels. The system includes a plurality N of analog channels that are multiplexed into an A/D converter. The A/D converter in turn supplies the multiplexed or interleaved digital data to an external computer where the data is stored in memory. The external computer includes direct memory access (DMA) demultiplexing logic according to the present invention which automatically reads the multiplexed data and rewrites the multiplexed data into a non-interleaved or demultiplexed format. Once all the multiplexed digital data has been received and stored in the computer system, the demultiplexing logic of the present invention performs DMA transfers to demultiplex or de-interleave the data into N independent buffers or memory spaces which are no longer interleaved. The DMA multiplexing logic performs a transfer for each analog channel to split the data for each analog channel into separate buffers. The DMA demultiplexing logic performs each transfer by incrementing through addresses of the multiplexed data to transfer only the data corresponding to a respective analog channel. The demultiplexing logic increments by the transfer size and an address sequencing value which is the number of analog channels of data in the multiplexed data. In other words, the DMA demultiplexing logic sequences a multiple N times the transfer size, wherein the multiple N is the number of analog channels of interleaved data received by the computer system.

15 Claims, 4 Drawing Sheets

5,686,917

SYSTEM AND METHOD FOR DEMULTIPLEXING DATA IN AN INSTRUMENTATION SYSTEM

FIELD OF THE INVENTION

The present invention relates to the acquisition of data in instrumentation systems, and more particularly to a system and method for receiving multiplexed data from a plurality of different channels and automatically storing this data in a non-interleaved format.

DESCRIPTION OF THE RELATED ART

Modern instrumentation systems are moving from dedicated stand-alone instruments to a concept referred to as virtual instrumentation. In virtual instrumentation, a computer system controls one or more instruments implemented on a card or receives raw data for instrumentation processing. In a typical data acquisition instrumentation system, an external computer receives analog data from one or more processes or units under test from a plurality of different analog channels and stores this data for processing. Since analog data cannot be supplied directly to a computer system, one or more analog-to-digital (A/D) converters are used to transform the analog data into digital data that is understandable by the computer. However, due to the fact that A/D converters are relatively expensive compared to analog channels, a typical data acquisition instrumentation system includes multiple analog channels that are multiplexed into a single A/D converter. The A/D converter in turn provides this multiplexed data to the computer system for analysis and presentation. One problem with having multiple channels of analog data that are multiplexed into a single data stream is that the data is stored in the computer system in an interleaved format. This results in additional processing required by the application program to sort the data for intelligent analysis and presentation. Therefore, a system and method for efficient demultiplexing of data in an instrumentation system is desired.

SUMMARY OF THE INVENTION

An instrumentation system according to the preferred embodiment of the present invention includes multiple analog channels that are multiplexed into an A/D converter. The A/D converter in turn supplies the multiplexed or interleaved digital data to an external computer where the data is stored in memory. The external computer includes direct memory access (DMA) demultiplexing logic according to the present invention which reads the multiplexed data and rewrites the multiplexed data in a non-interleaved or demultiplexed format.

In the preferred embodiment of the invention, once all the multiplexed digital data has been received and stored in the computer system, the host CPU enables the demultiplexing logic. The demultiplexing logic of the present invention performs DMA transfers to demultiplex or deinterleave the data into N independent buffers or memory spaces which are no longer interleaved. The DMA multiplexing logic performs a transfer for each analog channel to split the data for each analog channel into separate buffers. The DMA demultiplexing logic performs each transfer by incrementing through addresses of the multiplexed data to transfer only the data corresponding to a respective analog channel. The demultiplexing logic increments by the transfer size and an address sequencing value which is the number of analog channels of data in the multiplexed data. In other words, the DMA demultiplexing logic sequences a multiple N times the transfer size, wherein the multiple N is the number of analog channels of interleaved data received by the computer system. Thus, if multiple processes are executing on the CPU in the computer system, and each process performs an operation depending upon the data received from a respective analog channel, the present invention de-interleaves the data so that each process has its own copy of the data for its respective channel.

In another embodiment, a plurality N of instruments are included in the instrumentation system which receives the multiplexed data. In this embodiment, the DMA demultiplexing logic of the present invention obtains the interleaved data and provides the data out to the multiple devices, i.e., broadcasts the data out to the multiple devices, in a non-interleaved or demultiplexed form.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
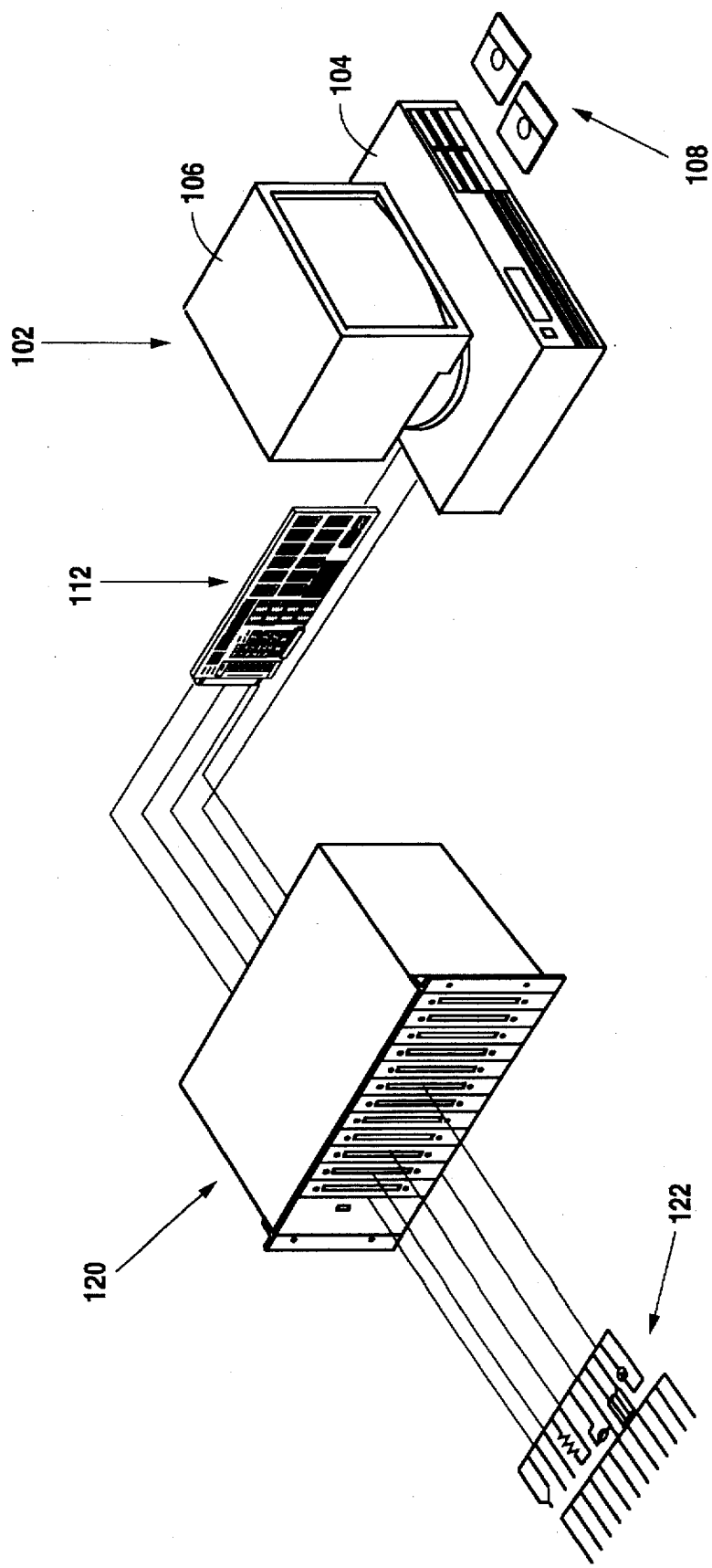
FIG. 1 illustrates an instrumentation system according to the present invention.

Referring now to FIG. 1, an instrumentation system incorporating direct memory access (DMA) demultiplexing logic of the present invention is shown. As shown, the instrumentation system includes a computer system 102. The computer 102 includes a system unit 104 and monitor 106, as shown. The computer system 102 also executes various software 108 for controlling data acquisition. The computer 102 may also execute various software for analysis and presentation of data as desired. The computer system 102 includes data acquisition and analysis (DAQ) hardware 112. The data acquisition hardware 112 is comprised within the system unit 104 of the computer 102, but is shown external to the computer system 102 in FIG. 1 for illustrative purposes.

The instrumentation system shown in FIG. 1 also includes a plurality of transducers 122, which receive analog data from one or more processes or units under test (not shown). The transducers 122 sense physical phenomenon from the processes or units under test and provides electrical signals that the data acquisition (DAQ) hardware can accept. Examples of various types of transducers includes strain gauges, flow transducers, pressure transducers, etc. In each instance the electrical signals produced are proportional to the physical parameters being monitored. The electrical signals produced by the transducers 122 are provided to signal conditioning logic 120, as shown. Signal conditioning logic 120 is used to convert the electrical signals generated by the transducers into a form that is acceptable to the DAQ board 112. The signal conditioning functions performed by the signal conditioning 120 may include amplification of low level signals, signal isolation, and signal filtering.

The data acquisition card 112 includes a plurality N of analog channel inputs for receiving analog data from the signal conditioning logic 120 and transducers 122. The DAQ card 112 also includes multiplexing logic for measuring data from these plurality of analog signals with a single analog to digital converter (A/D converter). As discussed in the background section, A/D converters are generally very expensive, and thus multiple different analog channels are generally multiplexed into a single A/D converter, thus reducing the cost of the DAQ card 112. In the preferred embodiment, the A/D converter included on the DAQ card 112 implements the multiplexing function.

Figure 2:
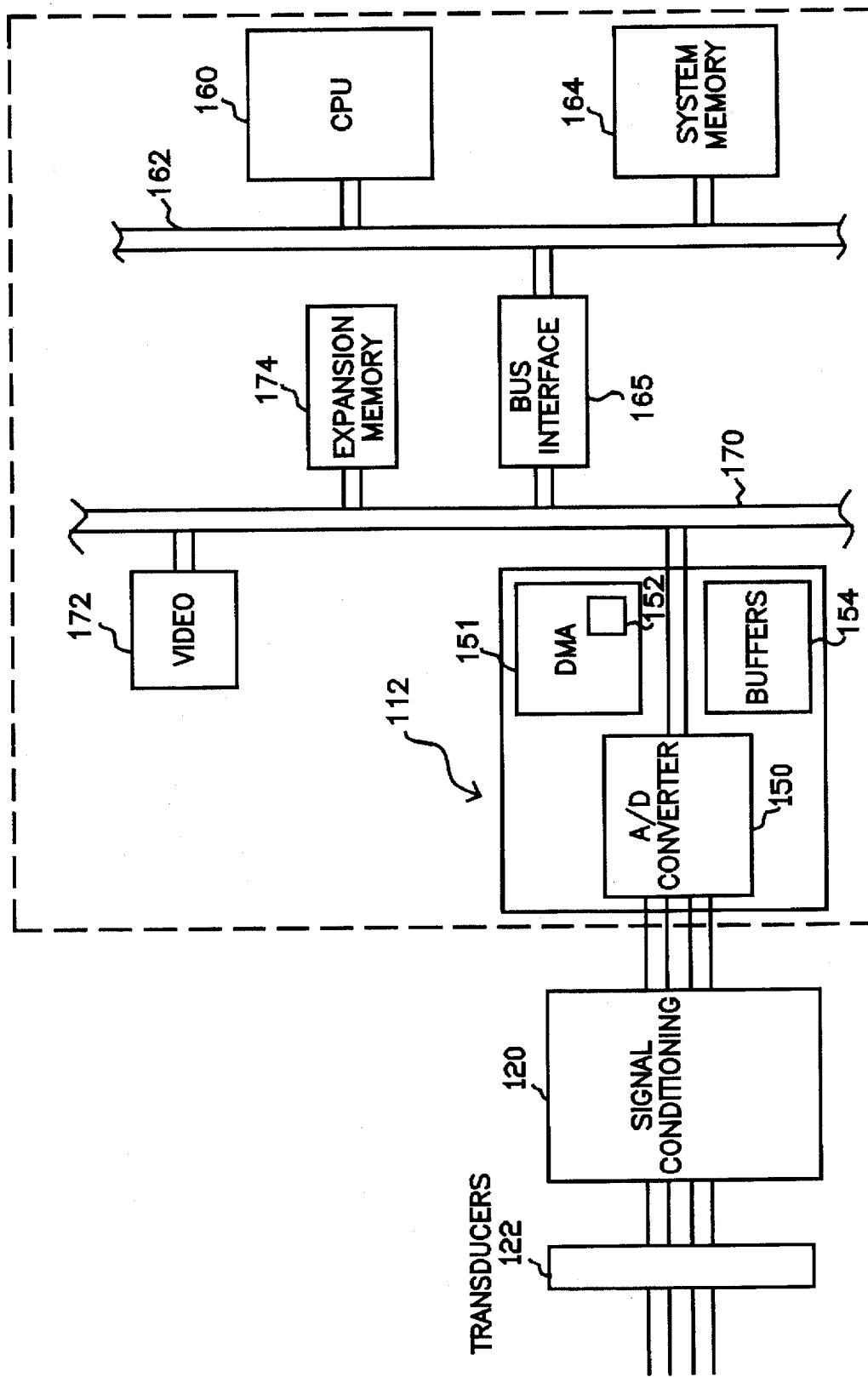
FIG. 2 is a block diagram of the instrumentation system of FIG. 1.

Referring now to FIG. 2, a block diagram illustrating the instrumentation system in FIG. 1 is shown. As shown, the computer system 102 includes a central processing unit, or CPU 160 coupled to a system bus 162. System memory 164 is also coupled to the system bus 162. The system bus 162 is coupled through a bus interface 164 to an expansion bus 170. The expansion bus 170 may be any of various types, including the Industry Standard Architecture (ISA), the Extended Industry Standard Architecture (EISA) bus, or a local bus such as the peripheral component interconnect (PCI) bus or the VL bus, as desired. The DAQ card 112 is coupled to the expansion bus 170. A video card 172 and expansion bus memory 174 are also preferably coupled to the expansion bus 170.

The instrumentation system shown in FIG. 2 includes four transducers 122 which sense various physical phenomenon. The four transducers 122 provide four analog outputs to signal conditioning logic 120, as shown. The signal conditioning logic 120 performs various operations and provides four analog data outputs to the data acquisition card 112. As shown, the DAQ card 112 includes A/D conversion logic 150 for converting the analog signals into digital signals understandable by the computer system 102. As shown, the A/D converter 150 multiplexes the four analog inputs and produces a single digital output provided to the remainder of the computer system 102. The DAQ card 112 also include DMA demultiplexing logic 152 according to the present invention, as well as buffers 154. It is noted that external analog multiplexers may be used to increase the number of channels the DAQ card 112 can measure. It is noted that the instrumentation system may include any number of analog channels and transducers 122.

In the preferred embodiment, the A/D converter 150 receives the four analog input signals and provides multiplexed digital data that is output to memory in the computer system. The A/D converter 150 samples one analog channel, switches to the next channel, samples that next channel, switches to the next channel, and so on. The multiplexed digital data may be output either to the expansion bus memory 174 or may be provided to the system memory 164. In addition, if the data acquisition card 112 includes sufficient buffering memory, the multiplexed digital data may be stored directly in the buffers 154. Once the analog input data has been received and converted into multiplexed digital data and stored in the computer memory, the DMA demultiplexing logic 152 then reads the multiplexed data from the memory where the multiplexed data is located, for example, the system memory 164, and writes the data back in a demultiplexed or deinterleaved form. The DMA demultiplexing logic 152 includes address sequence and transfer size registers for sequencing through the multiplexed data to rewrite the data in non-multiplexed form.

Figure 3:
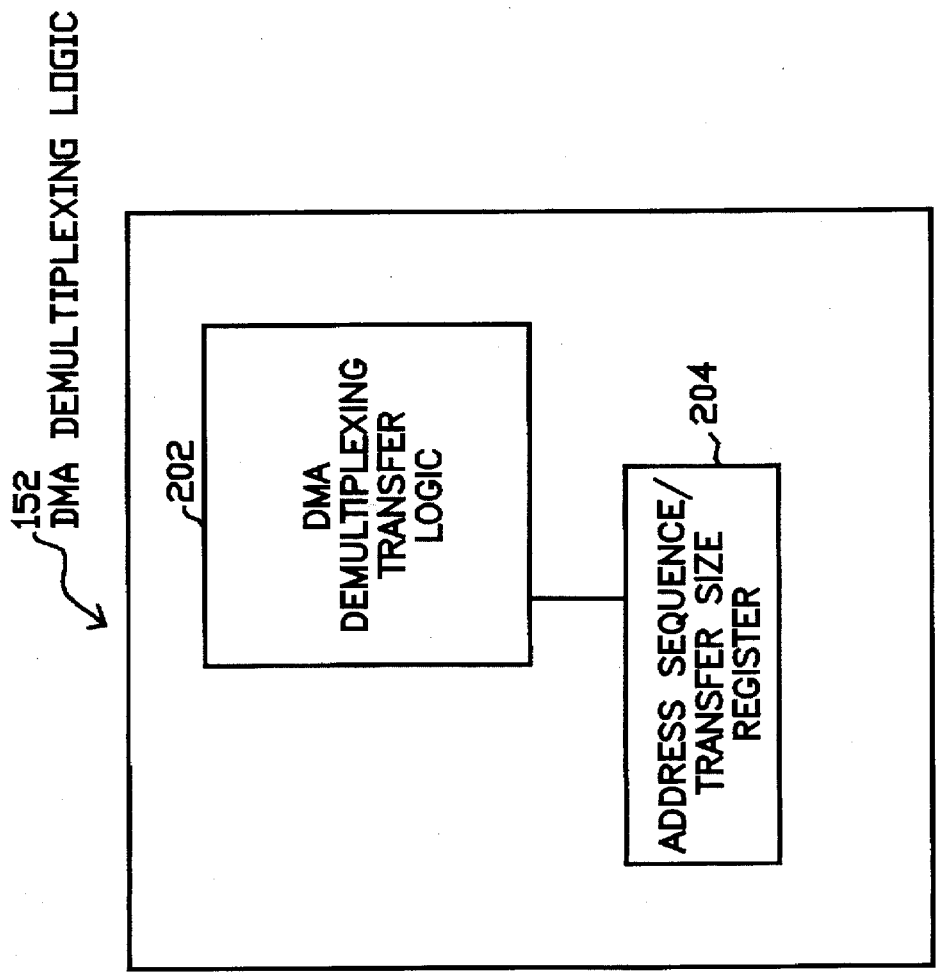
FIG. 3 is a more detailed block diagram of the DMA demultiplexing logic of FIG. 2.

Referring now to FIG. 3, a more detailed block diagram of the DMA demultiplexing logic 152 is shown. As shown, the DMA demultiplexing logic 152 includes DMA demultiplexing transfer logic 202 coupled to an address sequence/ transfer size register 204. The address sequence/transfer size register 204 includes various values which control the DMA demultiplexing transfer used to transform the multiplexed digital data into demultiplexed data. This register includes an address sequence field referred to as ASEQ[3:0] which determines the address sequencing, i.e., determines how the respective address is to be modified for the next transfer. The value stored in ASEQ[3:0] generally corresponds to the number N of analog channels provided to the A/D converter 150. In the preferred embodiment, the most significant bit (msb) of ASEQ[3:0], ASEQ[3], stores the sign bit. The remaining bits ASEQ[2:0] preferably select a power of 2 number that is multiplied by the transfer size value. In an alternate embodiment, the transfer size value can vary by any amount. The register 204 also includes a transfer size field referred to as PSIZE[1:0] which sets the size of the port for the transfer. In the preferred embodiment, the value 01 indicates an 8-bit transfer size, the value 10 indicates a 16-bit transfer size, and the value 11 indicates a 32-bit transfer size. The address sequence value is multiplied by the transfer size value to index in the multiplexed data stored in the computer memory to transfer only the data corresponding to a respective analog channel. This is performed for each of the analog channels, and thus the data is demultiplexed into four different address spaces. In other words, the data from one analog channel is stored in one contiguous address space, the data from a second analog channel is stored in a second contiguous address space different from the first, and so on.

Figure 4:
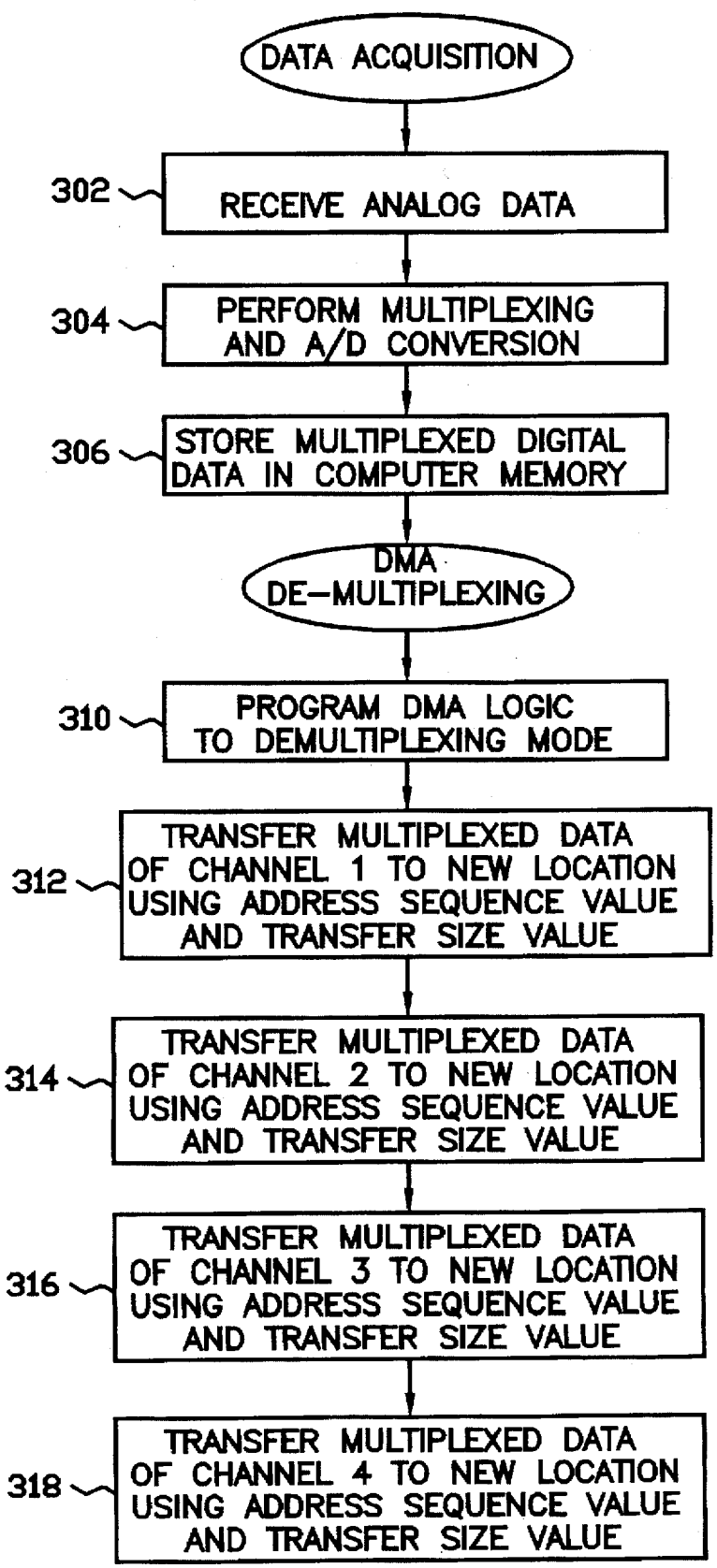
FIG. 4 is a flowchart diagram illustrating operation of the DMA demultiplexing logic of the present invention.

Referring now to FIG. 4, a flowchart diagram illustrating DMA demultiplexing according to the present invention is shown. As shown, in step 302 the A/D converter 150 receives analog data from the transducers 122 and signal conditioning logic 120. In step 304 the A/D converter 150 performs multiplexing and A/D conversion to produce a multiplexed or interleaved output stream of digital data. It is noted that the multiplexing can be performed before or after the A/D conversion, as desired. In step 306 this multiplexed digital data is stored in the computer memory, such as in either the expansion bus memory 174 or the system memory 164. In the preferred embodiment, the multiplexed digital data is stored in the expansion bus memory 174. It is also noted that if the buffers 154 in the DAQ card 112 are sufficiently large, the multiplexed digital data may be stored in the buffers 154.

Once the multiplexed digital data has been received and stored, DMA demultiplexing according to the present invention occurs. In step 310 the host CPU 160 programs the DMA logic 151 into a demultiplexing mode which activates the DMA demultiplexing logic 152 of the present invention. It is noted that the host CPU 160 can activate the DMA demultiplexing logic 152 at any time before the demultiplexing transfer is desired to be initiated. Also, it is noted that in an alternate embodiment the DMA demultiplexing logic 152 automatically performs demultiplexing operations on the digital data after the data is stored in computer memory in step 306.

In step 312 the DMA demultiplexing logic 152 operates to transfer the multiplexed digital data corresponding to channel 1 to a new contiguous location in the system memory 164. The DMA demultiplexing logic 152 multiplies the address sequence value times the transfer size value to determine a proper indexing value. This indexing value is used to index or increment through the memory where the interleaved data is stored in order to transfer only the data corresponding to analog channel 1 to the new location in system memory 164. This process is repeated for each of the remaining analog channels 2, 3, and 4 in steps 314, 316, and 318, respectively. It is noted that prior to the data acquisition, the address sequence/transfer size register 204 is loaded with the proper address sequence and transfer size values corresponding to the number of analog channels and the transfer size of the data to be received. Thus, as in the present example, if four analog channels are being provided to the A/D converter 150, then the address sequence value is set equal to 4. Also, if the A/D converter converts the analog data into a 16-bit digital value, then the transfer size is set equal to 16.

In the preferred embodiment, the DMA demultiplexing logic 152 transfers the data corresponding to each of the channels back to a respective contiguous address based on system memory 164. In an alternate embodiment, in steps 312–318 the DMA demultiplexing logic 152 reads the multiplexed or interleaved data and, instead of transferring the demultiplexed data back to separate address spaces of the same memory, the demultiplexing logic 152 transfers the demultiplexed digital data for each respective channel out through a digital to analog converter (D/A converter) to a respective instrument. In this manner, digital data is demultiplexed and provided directly to respective different instruments for processing.

Therefore, a system and method for performing improved data acquisition in an instrumentation system is shown. Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for performing data acquisition in an instrumentation system comprising a plurality N of analog channels, analog to digital conversion logic coupled to said plurality N of analog channels, memory coupled to said analog to digital conversion logic and direct memory access demultiplexing logic coupled to the analog to digital conversion logic and the memory, the method comprising the steps of:

receiving analog data from said plurality N of analog channels;
   performing analog to digital conversion on said analog data;
   multiplexing said data from said plurality N of analog channels into one or more multiplexed digital data streams;
   storing said multiplexed digital data in the memory;
   activating said direct memory access demultiplexing logic; and
   transferring portions of said multiplexed digital data corresponding to respective ones of said plurality N of channels to respective new locations in said memory, wherein said portions of said multiplexed data corresponding to respective ones of said plurality of N channels are stored in respective separate address spaces in said memory.

2. The method of claim 1, wherein said direct memory access demultiplexing logic includes at least one register storing an address sequence value and a transfer size value, wherein said step of transferring includes multiplying said address sequence value and said transfer size value to index through said multiplexed digital data.

3. The method of claim 2, further comprising:
   programming said at least one register with an address sequence value and a transfer size value, said step of programming occurring prior to said step of transferring.

4. The method of claim 2, wherein said step of transferring comprises:
   transferring data corresponding to a first channel of said N channels to a new location in said memory using said address sequence value and said transfer size value;
   performing said step of transferring data corresponding to said first channel for each of said remaining N-1 channels.

5. The method of claim 2, wherein said index produced from said address sequence value and said transfer size value is a power of 2.

6. A method for performing data acquisition in an instrumentation system comprising a plurality N of channels, multiplexing logic coupled to said plurality N of channels, memory coupled to said multiplexing logic, and direct memory access demultiplexing logic coupled to the multiplexing logic and the memory, the method comprising the steps of:

receiving data from said plurality N of channels;
   multiplexing said data from said plurality N of channels into one or more multiplexed data streams;
   storing said multiplexed data in the memory; and
   transferring portions of said multiplexed digital data corresponding to respective ones of said plurality N of channels to respective new locations in said instrumentation system, wherein said portions of said multiplexed data corresponding to respective ones of said plurality of N channels are transferred to respective separate locations in said instrumentation system.

7. The method of claim 6, wherein said step of transferring comprises transferring portions of said multiplexed digital data corresponding to respective ones of said plurality N of channels to respective new locations in said memory, wherein said portions of said multiplexed data corresponding to respective ones of said plurality of N channels are stored in respective separate address spaces in said memory.

8. The method of claim 6, wherein said direct memory access demultiplexing logic includes at least one register storing an address sequence value and a transfer size value, wherein said step of transferring includes multiplying said address sequence value and said transfer size value to index through said multiplexed digital data.

9. The method of claim 8, further comprising:
   programming said at least one register with an address sequence value and a transfer size value, said step of programming occurring prior to said step of transferring.

10. An instrumentation system which automatically demultiplexes acquired multiplexed data, comprising:

a plurality N of analog channels;
   multiplexing logic coupled to said plurality N of analog channels which multiplexes data from said plurality N of analog channels to produce a single data stream;
   analog to digital conversion logic coupled to said plurality N of analog channels which performs analog to digital conversion on data from said analog channels;
   memory coupled to said analog to digital conversion logic which stores multiplexed digital data output from said analog to digital conversion logic and said multiplexing logic; and
   direct memory access demultiplexing logic coupled to said analog to digital conversion logic, said multiplexing logic, and the memory, wherein said direct memory access demultiplexing logic transfers portions of said multiplexed digital data corresponding to respective ones of said plurality N of channels to respective new locations in said memory, wherein said portions of said multiplexed data corresponding to respective ones of said plurality of N channels are stored in respective separate address spaces in said memory.

11. The instrumentation system of claim 10, wherein said instrumentation system further includes:

direct memory access logic coupled to said analog to digital conversion logic, said multiplexing logic, and the memory, wherein said direct memory access logic includes said direct memory access demultiplexing logic; and a CPU coupled to said direct memory access logic which programs said direct memory access logic in a demultiplexing mode to activate said direct memory access demultiplexing logic.

12. The instrumentation system of claim 10, wherein said direct memory access demultiplexing logic includes at least one register storing an address sequence value and a transfer size value, wherein said direct memory access demultiplexing logic multiplies said address sequence value and said transfer size value to index through said multiplexed digital data.

13. The instrumentation system of claim 12, further comprising:

a CPU coupled to said direct memory access demultiplexing logic which programs said at least one register with an address sequence value and a transfer size value.

14. The instrumentation system of claim 12, wherein said direct memory access demultiplexing logic transfers data corresponding to respective channels of said N channels to a respective new location in said memory using said address sequence value and said transfer size value for each of said N channels.

15. The instrumentation system of claim 12, wherein said index produced from said address sequence value and said transfer size value is a power of 2.

* * * * *